June 5, 1951 C. D. PAINTER 2,555,655
FOLDING BOX
Filed Nov. 19, 1945 4 Sheets-Sheet 1
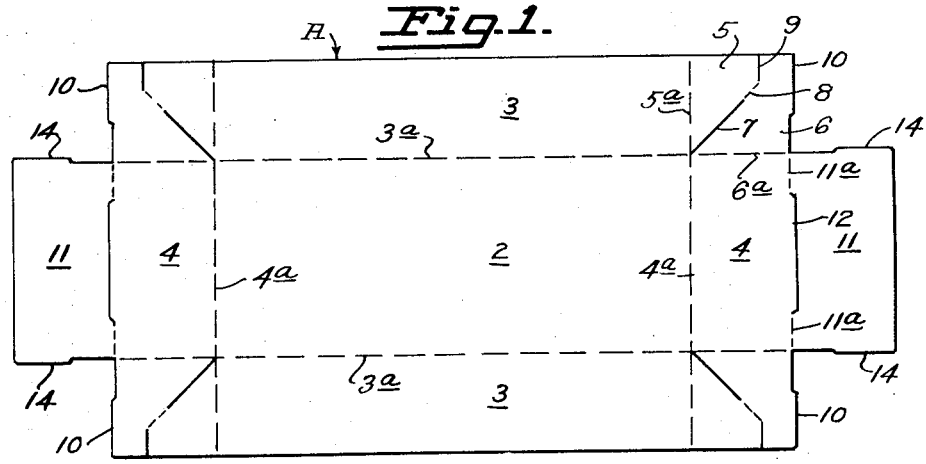
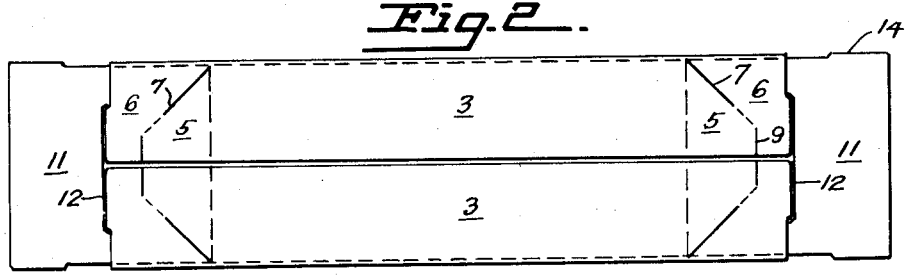
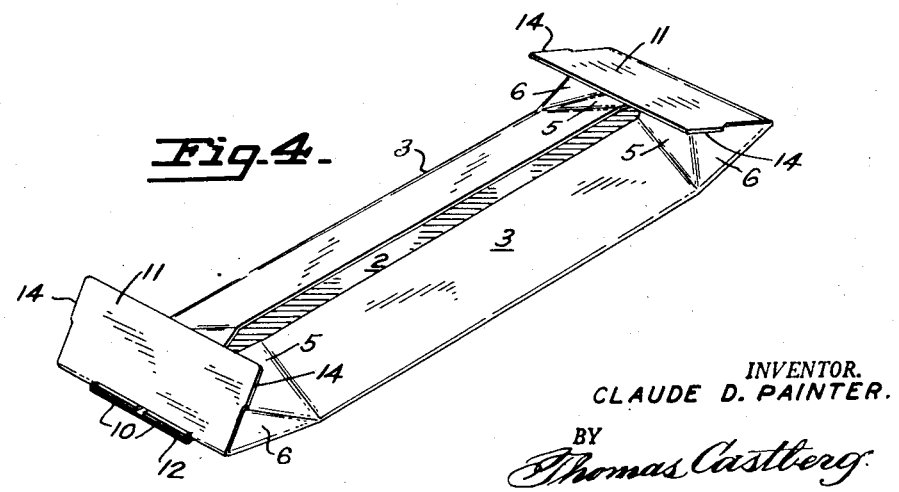
INVENTOR.
CLAUDE D. PAINTER.
BY
Thomas Castberg
ATTORNEY.

June 5, 1951     C. D. PAINTER     2,555,655
FOLDING BOX
Filed Nov. 19, 1945     4 Sheets-Sheet 2
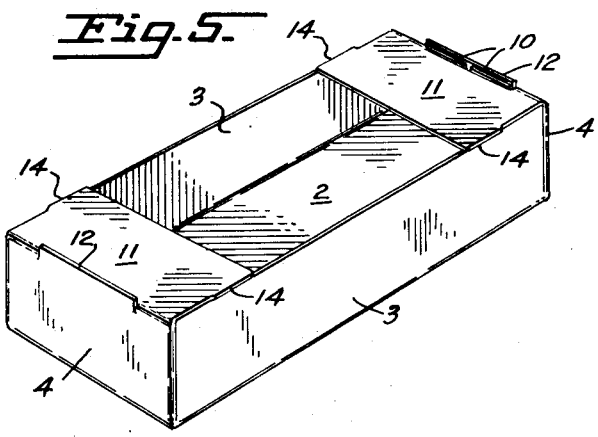
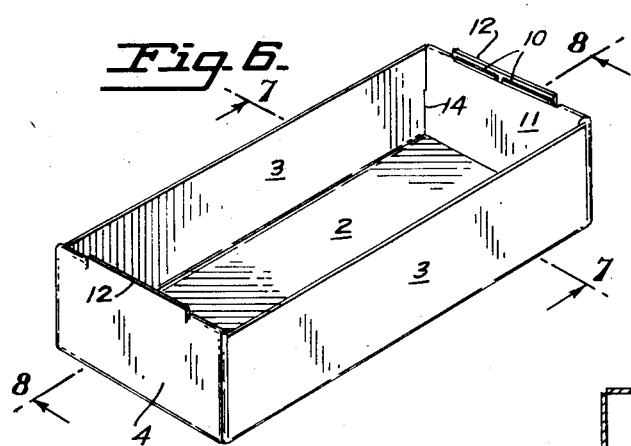
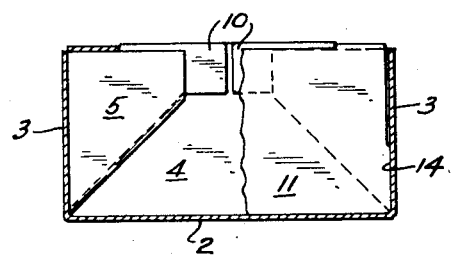
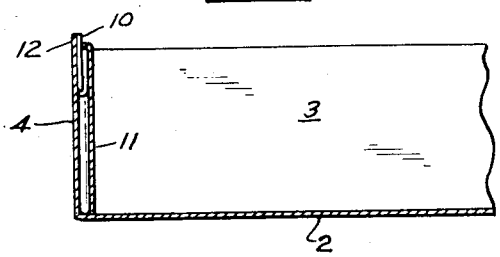
INVENTOR.
CLAUDE D. PAINTER.
BY *Thomas Castberg*
ATTORNEY.

June 5, 1951  C. D. PAINTER  2,555,655
FOLDING BOX
Filed Nov. 19, 1945  4 Sheets-Sheet 3
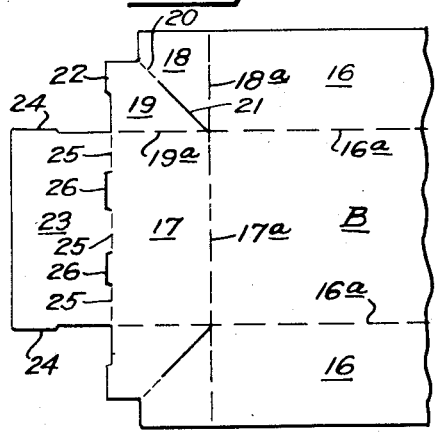
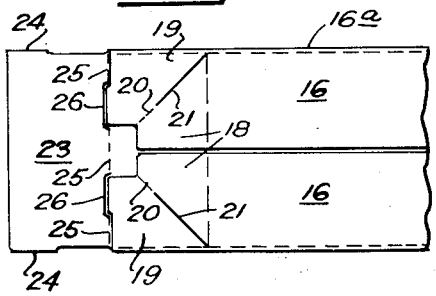
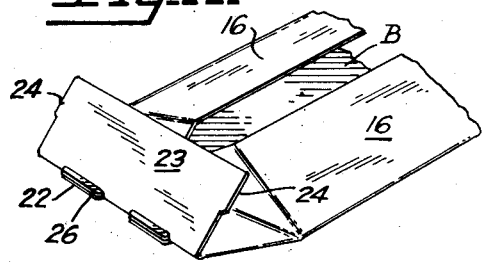
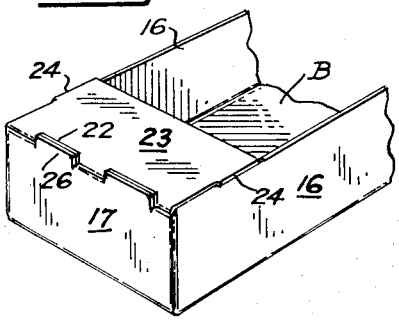
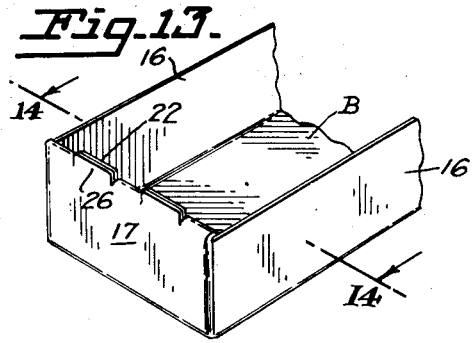
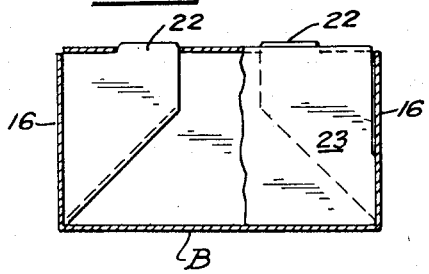
INVENTOR.
CLAUDE D. PAINTER.
BY
Thomas Castberg
ATTORNEY.

June 5, 1951  C. D. PAINTER  2,555,655
FOLDING BOX
Filed Nov. 19, 1945  4 Sheets-Sheet 4
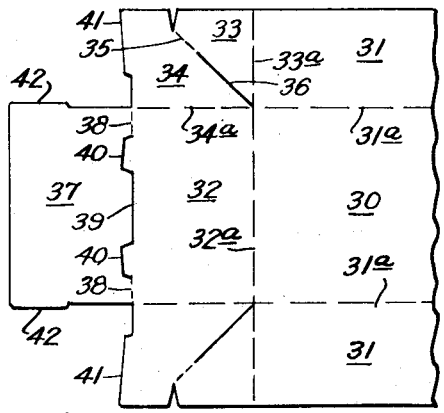
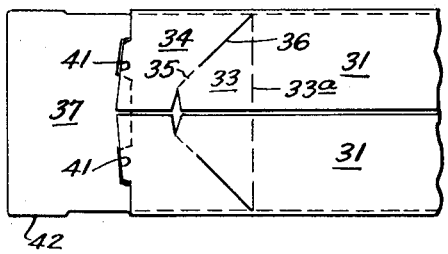
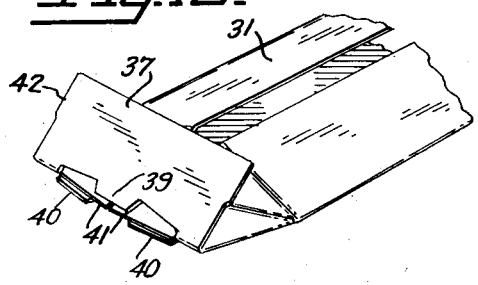
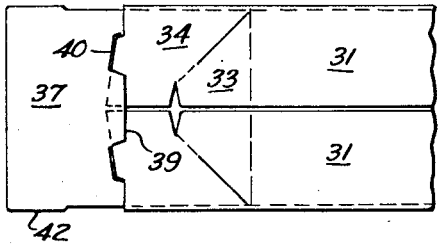
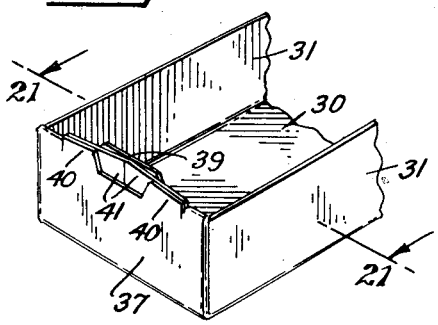
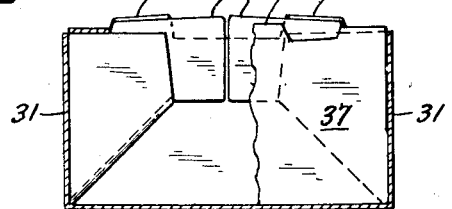
INVENTOR.
CLAUDE D. PAINTER.
BY
Thomas Castberg
ATTORNEY.

Patented June 5, 1951

2,555,655

UNITED STATES PATENT OFFICE 2,555,655

FOLDING BOX

Claude D. Painter, San Francisco, Calif.

Application November 19, 1945, Serial No. 629,349

4 Claims. (Cl. 229—32)

This invention relates to folding boxes, and especially that type which is made in flat folded form and which is erected or opened when required for use by merely applying a slight pressure to the opposite ends of the folded form.

The object of the present invention is generally to improve and simplify the construction and operation of boxes of the character described; to provide a folding box which is readily blanked, scored and folded into flat form by machine operation and with a minimum of waste; to provide a folding box which provides ample rigidity and strength when erected or opened, even though gluing of the connected parts is entirely eliminated; to provide a folding box in which the side and end panels are connected at each corner by a pair of foldable hinge sections, said hinge sections being flat when the box is folded and being folded when the box is erected and being retained in their folded position by a pair of panels which form an extension of the end panels and are foldably connected thereto; and further, to provide a lug on one section of each foldable hinge and a slot between each end and connected extension panel into which the lugs project when the box is erected so as to positively lock the foldable hinge sections when assuming folded position.

The folding box is shown by way of illustration in the accompanying drawings, in which:

Fig. 1 is a plan view of a box blank;

Fig. 2 is a plan view showing the side panels and the connected folding hinges folded over the bottom section of the box;

Fig. 3 is a side elevation of Fig. 2;

Fig. 4 is a perspective view showing the extension panels folded over the hinge members and in a position where their pressure will cause opening or erection of the box;

Fig. 5 is a perspective view showing the box erected;

Fig. 6 is a perspective view showing the extension panels folded downwardly into the box to cover and retain the folded hinge sections with relation to the end panels of the box;

Fig. 7 is an enlarged cross section taken on line 7—7 of Fig. 6, said section being partially broken away to show one of the folded hinge sections and the lug carried thereby which extends through the slot formed between the end panel and the extension panel;

Fig. 8 is a vertical longitudinal section taken on line 8—8 of Fig. 6;

Fig. 9 is a plan view of one half of a box blank showing a modified form of construction;

Fig. 10 is a plan view of the type of blank shown in Fig. 9 but showing the side panels and the foldably connected hinge sections folded over the bottom section;

Fig. 11 is a perspective view of one-half of a box formed from the blank shown in Fig. 9 with the extension panel partially folded and the box in position to be erected by the application of end pressure;

Fig. 12 is a similar perspective view showing the box erected and the extension panel ready to assume its final position;

Fig. 13 is a perspective view similar to Fig. 12 showing the extension panel in final position;

Fig. 14 is an enlarged cross section taken on line 14—14 of Fig. 13, said view being partially broken away to show one of the folded hinge members and the locking lug carried thereby;

Fig. 15 is a plan view of one-half of a box blank showing another modification of the same;

Fig. 16 is a plan view of the blank shown in Fig. 15 but showing the side panels and the foldable hinge sections folded over the bottom section;

Fig. 17 is a view similar to Fig. 16 but showing the lug on the extension panel folded over the lugs carried by the foldably connected hinge sections;

Fig. 18 is a perspective view of one-half of a box formed from the blank shown in Fig. 15 with the extension panel partially folded and the box ready for erection;

Fig. 19 is a perspective view similar to Fig. 18 showing the box erected and with the extension panel in horizontal position;

Fig. 20 is a perspective view similar to Fig. 19 showing the box fully erected and the extension panel in final position; and Fig. 21 is an enlarged cross-section taken on line 21—21 of Fig. 20, said view being partially broken away to show one of the folded hinge sections and the locking lug carried thereby.

Referring to the drawings in detail, and particularly Fig. 1, A indicates in general a box blank forming the subject matter for the present application. The box consists of a bottom section 2, a pair of side panels 3—3 and a pair of end panels 4—4, the side and end panels being integral with the bottom section 2 but being defined therefrom by score lines such as indicated at 3a and 4a. The side and end panels are connected at each corner by a pair of substantially triangular-shaped hinge sections indicated at 5 and 6. The section 5 forms an integral part of the side panel 3 but a score line 5a is formed between them to form a folding connection. The triangular section 6 is similarly connected to the end panel 4 by a score line 6a to form a foldable connection, and a foldable connection is formed between the two triangular-shaped sections by a cut line 7, a score line 8 and a cut line 9. In addition thereto it may be stated that the hinge section 6 has a projecting lug 10, the purpose of which will hereinafter be described.

Each end panel 4 carries an extension panel 11. A score line 11a is formed between them and a cut line 12 is also formed between them. The cut line forms a slot, the purpose of which will hereinafter be described, while the score line 11a forms a folding connection between the panels 4 and 11. It will be understood that there are two extension panels 11, one for each end panel of the box, and it should also be noted that each extension panel is provided with two lugs such as shown at 14—14, and further that there are four hinge sections, one at each corner of the box and as they are all identical in construction and operation, the description of one should suffice.

It will be understood that a blank of this character is blanked, cut and scored by die operation in a machine and is fed from that machine to a second machine which folds the side panels 3—3 together with the hinge sections 5 and 6 over the bottom section as shown in Fig. 2. This machine also stacks the blanks when so folded and they are shipped in this form to the consumer.

The boxes may, of course, have different uses depending upon the type of goods to be placed therein. Let it be assumed that the boxes are to be erected in a cookie factory and filled with cookies and then perhaps later wrapped in cellophane to seal and protect the contents. If this is the case, a stack of folded blanks such as shown in Figs. 2 and 3 will be placed in a convenient position adjacent an operator or packer. The operator takes the blanks one by one and places them on a flat surface. He or she then folds the extension panels 11 over the hinge sections 5 and 6 so that the extension panels will assume the position shown in Fig. 4. Then by applying a slight pressure at opposite ends of the extension panel 11, the hinge sections 5 and 6 will fold upon themselves along the score line 8 and the cut line 7, and the end panels 4 will then assume the position shown in Fig. 5 while the extension panels 11 will assume the horizontal position shown. Then by applying thumb pressure the extension panels are folded downwardly and inwardly towards the folded hinge sections pressing them against the inner surface of the panel 4 and covering and retaining them in this position. The lugs 14—14 at opposite sides of the extension panels serve as friction members when the extension panels are forced down between the side panels 3—3 and thus frictionally retain the extension panels as shown in Fig. 6. In other words inasmuch as the foldably connected hinge sections 5 and 6 connect the side panels to the end panels, it is essential that they be retained in the folded position against the inner surface of the end panels because if they were not retained in this position, they would tend to open and the side panels would be free to move outwardly and so would the end panels and the box would tend to flatten out, but as the extension panels cover the hinges in their flat folded position, and as the extension panels are secured on the friction lugs 11, it is obvious that the end panels and side panels are held in vertical position, and while this method of securing the hinges is fairly satisfactory, it is desirable that further means be provided for securing the hinge sections against unfolding and that is accomplished by a slot 12 formed by the respective end panels and their extensions panels, and by the lugs 10 carried by one member of each pair of foldably connected hinge members. That is, the lugs 10 extend through the slot 12 when the extension panel assumes the position shown in Fig. 5, and if anything extends still further through the slot 12 when the extension panels assume their final vertical position as shown in Fig. 6. Thus as the lugs 10 form a part of each hinge section, and as they project through the slots 12, the hinge sections are positively locked against unfolding and the strength and rigidity of the box is very materially increased as the hinge sections are not only secured against unfolding by the lugs just described, but also by the extension panels which are secured in position by the friction lugs 14—14.

In Figs. 9 to 14 a modified form of the box blank and box formed thereby is shown. In Fig. 9 only one half of the box blank is shown, but it is obvious that the other half of the box blank is identical. It consists of a bottom section B, side panels 16—16 connected thereto by score lines 16a and panels 17 connected by score lines 17a, hinge sections 18 and 19 connected to the respective side and end panels by score lines 18a and 19a and being themselves foldably connected by a score line 20 and a cut line 21. Also one member of each pair of hinges carries a lug 22 and the end panels are provided with extension panels 23 having side lugs 24 and being connected to the end panels 17 by score lines 25 and cut lines 26—26. The blank thus cut and scored is folded to assume the position shown in Fig. 10, that is the side panels 16—16 together with the hinged sections are folded over the bottom section and in this form are stacked and shipped to the consumer. The consumer removes them from the stack one by one as previously described and in erecting the box the first operation is to fold the extension panels 23 over the hinge sections as shown in Fig. 11. In so doing the lugs 22 carried by the hinge sections extend through the slots formed by the cut portions 26 (see Fig. 11). The next operation is to apply end and upward pressure to the panels and the box next assumes the position shown in Fig. 12. Then by pressing the extension panels downwardly into the box against the folded hinges as shown in Fig. 13, the erection or opening of the box is completed. The structure shown in Figs. 9 to 14 is substantially identical to that shown in Figs. 1 to 8, the only difference being that the lugs 10 as shown in the original structure are longer than the lugs 22 shown in Figs. 9 to 14, and by shortening the lugs as shown at 22, it is possible to form two cuts or slots 26 which are comparatively short while the long single slot 12 is required in the structure shown in Figs. 1 to 9.

The modified form of box shown in Figs. 9 to 14 possesses all the advantages and structural features of the box previously described as it has the same strength and rigidity but differs only in the arrangement of the lugs which positively lock the hinge sections against unfolding when the box is erected.

In Figs. 15 to 21 another modification is shown. The box blank shown in Fig. 15 has a bottom section 30, side panels 31 connected thereto by score lines 31a, and panels 32 connected to the bottom section by score lines 32a. It is also provided with hinge sections 33 and 34 connected to the respective side and end panels by score lines 33a and 34a and being themselves connected by a score line 35 and a cut line 36. The end panels have extension panels 37 connected by score lines 38—38 and by a cut line which forms a central lug 39 and two slots 40—40. Also the hinge sections 34 carry lugs 41 and extension panels carry friction lugs 42 just as in the other structures. Here again the box blank is cut and scored by die operation as previously described, and thereafter the side panels 31 together with the hinged sections are folded over the bottom section to assume the position shown in Fig. 16. A second operation is, however, added in this instance and that is the extension panels 37 are first swung downwardly at substantially right angles to the bottom section and then it is swung back to horizontal position. In so doing the lug 39 is transferred from a position below the lugs 41 to a position where it lies on top of them as shown in Fig. 17, thereby tending to hold the hinges and the side panels in flat position, and in this position the partially folded blanks are stacked and shipped to the consumer. Here the box is erected by first folding the extension panel 37 to assume the position shown in Fig. 18. Then by applying end and upper pressure, the box is erected and assumes the position shown in Fig. 19 and the position shown at 20 is assumed when the extension panel 37 is folded downwardly into the box end and secured by the friction lugs 42. The structure shown in Figs. 15 to 21 differs from the structure shown in Figs. 1 to 9 in that a lug 39 is formed on the extension panel and that lug serves only one function, to wit that of holding the hinge members in the flattened position shown in Fig. 17. Otherwise the structure, strength, operation and advantages of the box are the same as the boxes heretofore described.

Heretofore in the construction of folding boxes hinges such as shown in all three structures, that is the hinges which connect the end of the side panels of the box have been employed in different types of box structures, but in practically all cases one or another of these hinges are glued to the end or the side panels or gluing of other members has been resorted to in order to facilitate erection of the box from folded to open position and also to gain rigidity in a completed structure. Such gluing is not required in the present structure as the hinge members are locked in folded position first by the lugs projecting through the slots formed between the end and the extension panels and secondly they are held in folded position by the friction means carried by the extension panels to set the lugs 14 of Fig. 1 or the lugs 22 of Fig. 9 or the lugs 41 of Fig. 15.

Having thus described my invention, what I claim and desire to secure by Letters Patent is—

1. A paper box blank comprising a bottom panel, opposite side panels hingedly connected thereto substantially equal in height to one half the width of the bottom panel, opposite end panels hingedly connected thereto substantially equal in height to one half the width of the bottom panel and substantially square hinge sections hingedly connected to the side of each end panel and the end of each adjacent side panel with sides and ends equal in length to the height of said sides and ends and forming end and side continuations thereof, lugs formed on the ends of said hinge portions extending outwardly in the direction of the longitudinal dimension of said side panels, a straight inwardly directed cut formed in each side edge of each hinge section intermediate the ends thereof and parallel to the ends thereof, a diagonal fold line extending from the inner ends of the cut to the juncture of the hinge portion with the bottom panel and a foldable extension for said end member provided with a slot adjacent the fold line thereof adapted to receive at least one of said lugs.

2. A paper box blank comprising a bottom panel, opposite side panels hingedly connected thereto substantially equal in height to one half the width of the bottom panel, opposite end panels hingedly connected thereto substantially equal in height to one half the width of the bottom panel, and substantially square hinge sections hingedly connected to the side of each end panel and the end of each adjacent side panel with sides and ends equal in length to the height of said sides and ends and forming end and side continuations thereof, lugs formed on the ends of said hinge portions extending outwardly in the direction of the longitudinal dimension of said side panels, a straight inwardly directed cut formed in each side edge of each hinge section intermediate the ends thereof and parallel to the ends thereof, a diagonal fold line extending from the inner ends of the cut to the juncture of the hinge portion with the bottom panel and a foldable extension for said end member substantially equal in width to the width of the body and substantially equal in height to the height of said sides and ends provided with a slot adjacent the fold line thereof adapted to receive at least one of said lugs.

3. A paper box blank comprising a bottom panel, opposite side panels hingedly connected thereto, opposite end panels hingedly connected to the bottom panel, hinge sections hingedly connected to the side of each end panel and the end of each adjacent side panel and forming end and side continuations thereof, lugs formed on the ends of said hinge sections extending outwardly in the direction of the longitudinal dimension of said side panels, a straight inwardly directed cut formed in each side edge of each hinge section intermediate the ends thereof and parallel to the ends thereof, a diagonal fold line extending from the inner end of each cut to the juncture of its hinge section with the bottom panel, and a foldable extension for each end panel provided with a slot adjacent the fold line thereof, said lugs extending to the sides of the hinge sections, the sides of said hinge sections adapted to abut when the blank is erected to form continuous joint lugs receivable through said slots.

4. A paper box blank comprising a bottom panel, opposite side panels hingedly connected thereto, opposite end panels hingedly connected to the bottom panel, hinge sections hingedly connected to the side of each end panel and the end of each adjacent side panel and forming end and side continuations thereof, lugs formed on the ends of said hinge sections extending outwardly in the direction of the longitudinal dimension of said side panels, a straight inwardly directed cut formed in each side edge of each hinge section intermediate the ends thereof and parallel to the ends thereof, a diagonal fold line extending from the inner ends of each cut to the juncture of its hinge section with the bottom panel, and a foldable extension for each end panel provided with a slot adjacent its fold line, each foldable extension having end lugs and having the slot formed therein to provide a central tongue interposed between the end lugs so that the lugs of the hinge sections are engaged by the tongue on one side and by the foldable extension on the other, said end lugs on said foldable extensions adapted to frictionally engage said side panels when the blank is erected.

CLAUDE D. PAINTER.

REFERENCES CITED

The following references are of record in the file of this patent:

UNITED STATES PATENTS

| Number | Name | Date |
|---|---|---|
| 882,688 | Janicke | Mar. 24, 1908 |
| 1,103,238 | Zell | July 14, 1914 |
| 1,886,879 | Gross | Nov. 8, 1932 |
| 2,039,315 | Heineman | May 5, 1936 |
| 2,128,342 | Zalkind | Aug. 30, 1938 |
| 2,214,813 | Guyer | Sept. 17, 1940 |